United States Patent
Schwarzenberg (10) Patent No.: US 8,965,142 B2
(45) Date of Patent: Feb. 24, 2015

(54) METHOD AND DEVICE FOR CLASSIFYING A LIGHT OBJECT LOCATED AHEAD OF A VEHICLE

(75) Inventor: Gregor Schwarzenberg, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 13/591,429

(22) Filed: Aug. 22, 2012

(65) Prior Publication Data

US 2013/0058592 A1 Mar. 7, 2013

(30) Foreign Application Priority Data

Aug. 23, 2011 (DE) .......................... 10 2011 081 425

(51) Int. Cl.
*G06K 9/40* (2006.01)
*G06K 9/00* (2006.01)

(52) U.S. Cl.
CPC .................................. *G06K 9/00825* (2013.01)
USPC ........... 382/274; 382/103; 382/104; 340/907; 340/933

(58) Field of Classification Search
USPC ........... 382/103, 104, 274, 278; 340/907, 933
See application file for complete search history.

(56) References Cited

U.S. PATENT DOCUMENTS

| | | | | |
|---|---|---|---|---|
| 6,742,904 B2 * | 6/2004 | Bechtel et al. | ................ | 359/604 |
| 7,566,851 B2 * | 7/2009 | Stein et al. | ................ | 250/205 |
| 7,942,529 B2 * | 5/2011 | Tanassi et al. | ................ | 351/243 |
| 8,328,368 B2 * | 12/2012 | Luciano | ................ | 353/79 |
| 8,462,988 B2 * | 6/2013 | Boon | ................ | 382/104 |
| 8,552,852 B1 * | 10/2013 | Hertz et al. | ................ | 340/468 |
| 8,596,793 B2 * | 12/2013 | Tanassi et al. | ................ | 351/243 |
| 8,712,637 B2 * | 4/2014 | Ehlgen et al. | ................ | 701/36 |
| 8,854,201 B1 * | 10/2014 | Hertz et al. | ................ | 340/473 |

FOREIGN PATENT DOCUMENTS

DE 102 54 806 6/2004

* cited by examiner

*Primary Examiner* — Yosef Kassa
(74) *Attorney, Agent, or Firm* — Kenyon & Kenyon LLP (57) ABSTRACT

A method for classifying a light object located ahead of a vehicle, the method including a determination of a brightness curve assigned to the light object via at least two images which depict the light object at different times and a combination of the brightness curve with a characteristic brightness curve, in order to classify the light object.

20 Claims, 5 Drawing Sheets

METHOD AND DEVICE FOR CLASSIFYING A LIGHT OBJECT LOCATED AHEAD OF A VEHICLE

RELATED APPLICATION INFORMATION

The present application claims priority to and the benefit of German patent application no. 10 2011 081 425.6, which was filed in Germany on Aug. 23, 2011, the disclosure of which is incorporated herein by reference.

FIELD OF THE INVENTION

The present invention relates to a method and a device for classifying a light object located ahead of a vehicle and to a corresponding computer program product.

Surroundings of a vehicle may be monitored by a camera of a vehicle. Images of the camera may be analyzed by an image analysis unit to obtain information required for a driver assistance system. Such information may include data about other vehicles located in the surroundings of the vehicle.

BACKGROUND INFORMATION

Publication DE 102 54 806 B4 discusses a method for information processing of at least two information sources in a motor vehicle.

SUMMARY OF THE INVENTION

Against this background, a method and a device for classifying a light object located ahead of a vehicle and finally a corresponding computer program product according to the description herein are provided by the exemplary embodiments and/or exemplary methods of the present invention.

Advantageous embodiments result from the particular further descriptions herein.

Objects located ahead of a moving vehicle have different brightness curves over time from the viewpoint of a driver of the vehicle, depending on whether they are self-luminous or reflecting objects. The different brightness curves may also be recognized on images of a vehicle camera which detects the objects located ahead of the vehicle. Through a comparison of a brightness curve assigned to an instantaneously recognized object to a known characteristic brightness curve, which is assigned to an approximation of a reflecting object, for example, it may be determined whether the instantaneously recognized object is a self-luminous object or a reflecting object.

This allows a recognition of reflectors via the correlation of an instantaneous brightness curve with an approximated illumination distribution. The approximated illumination distribution may relate to an illumination of the reflectors induced by a headlight of the vehicle.

The described approach may be used for automatic high beam control systems. For such systems, it is necessary to separate recognized light objects into relevant light objects, which may be assigned to other traffic, and non-relevant objects, such as reflectors. In order to carry out a differentiation between self-luminous objects and reflecting objects and to allow a recognition or plausibility check of other traffic or reflectors, inter alia, the illumination characteristic of the reference vehicle may be used.

Through the use of a simplified or approximated illumination characteristic, an efficient method is provided for robustly classifying reflectors. The approximation simplifies the adaptation to different types of headlights. It is therefore not necessary to carry out a complex measurement of the illumination characteristic. The storage requirement for the characteristic may thus also be kept low.

The performance of the overall system may be set or applied simply via the selection of a variable time range for the reflector classification. The variable time range may specify a duration, during which the images of a light object are detected, to classify the light object.

Through the described approach, in particular pulsed light sources, for example, of LED tail lights or novel front headlight systems, may be rapidly detected, since they have brightness variations which differ strongly from those of a reflector. In the event of a correlation of a brightness curve assigned to a pulsed light source with a characteristic brightness curve assigned to a reflector, strong deviations result in the correlation in comparison to the assumption of a reflector instead of the pulsed light source.

The present invention provides a method for classifying a light object located ahead of a vehicle, the method including the following:

determining a brightness curve assigned to the light object over at least two images which depict the light object at different times; and combining the brightness curve with a characteristic brightness curve to classify the light object.

The vehicle may be a passenger automobile or a truck, for example. The vehicle may move on a road while the method is executed. The light object may be situated ahead of the vehicle in the driving direction. The light object may be located in an area illuminated by a headlight of the vehicle. The light object may be a light-emitting object, which is recognizable on an image, for example, of a camera of the vehicle. In the image, the object may be represented as an area which includes one or more pixels and is brighter in comparison to the surroundings. Between a point in time of a recording of a first image and a further image of the at least two images, a distance between the vehicle and the light object may change. If the light object is a reflector, a reflection angle between a light beam emitted by the headlight onto the light object and a light beam reflected from the reflector to the vehicle may change due to a change of the distance. This may result in an apparent brightness change of the light object between the points in time of the recordings of two or more images. The brightness change may be recognized by analyzing the images and represented as a brightness curve. The brightness curve may include values for the brightness of the light object which are plotted over time, over a covered route, or over a distance change between the vehicle and the light object. In the step of combination, an instantaneously ascertained brightness curve, which is assigned to a real object depicted in the images, may be compared to a stored brightness curve, the characteristic brightness curve. If the instantaneously ascertained brightness curve and the characteristic brightness curve correspond at least approximately or within certain tolerance ranges, it may be presumed that the light object which has induced the instantaneously ascertained brightness curve is an object which has similar properties with respect to its light emission as an object assigned to the characteristic brightness curve. If the characteristic brightness curve is assigned to a reflecting object, for example, by executing the method, the light object depicted in the images may be classified as a self-luminous object or as a reflecting object. The more images are analyzed per time interval and the greater the time interval is, the more precisely may the classification be carried out. The number of images per time interval and also a length of the time interval may be fixedly predefined or settable. If a setting capability is provided, this may be a function of a speed of the vehicle, for example. The time interval may also be lengthened until a performed classification of the light object provides a plausible result, or the light object has departed from a detection range of the camera.

The method may include a step of selecting the characteristic brightness curve as a function of an instantaneous illumination characteristic of a headlight of the vehicle, which illuminates the area ahead of the vehicle. The headlight may be one of two front headlights of the vehicle. The illumination characteristic may be a function of an operating state of the headlight and additionally or alternatively a type of the headlight. The illumination characteristic may relate to a light quantity and light distribution emitted by the headlight. Information concerning the illumination characteristic may be received via an interface from a control unit for activating the headlight. Through the consideration of the illumination characteristic, a real brightness curve may be depicted very exactly by the characteristic brightness curve.

In the step of determination, a first brightness of the light object may be determined in a first image which depicts the light object and at least one second brightness of the light object may be determined in at least one second image which depicts the light object. The brightness curve may be determined from the first brightness and at least one second brightness. If more than two images are analyzed, the brightness curve may be determined from the corresponding brightnesses of the light object in the particular images. The more images are analyzed, the more precisely may the brightness curve be represented.

In the step of determination, the brightness curve may be determined as a change between the first brightness and at least the second brightness. The brightness curve may therefore be determined as a difference between the at least two brightnesses determined in the different images. In this way, the brightness curve may be determined very simply. The combination with the characteristic brightness curve may also be carried out using a linkage guideline which is simple to implement.

In the step of determination, the brightness curve may be determined via a number of images, which are recorded within a predefinable time span and depict the light object. The images may be recorded by the camera of the vehicle at certain time intervals. The time intervals may also be shortened, if a light object which is to be classified is recognized in an image. The time span may be selected in such a way that experience has shown that images recorded within the time span are sufficient for classifying the light object. The time span may also be selected to be as long as the light object is recognizable in the images or until the light object is unambiguously classified. Steps of the method may already be executed while the time span is still continuing and therefore further images are recorded, which are used as the foundation for classifying the light object.

The steps of determination and combination may therefore be carried out continuously until the light object is classified. In this way, on the one hand, a classification may be carried out with high precision. On the other hand, execution of the method may be terminated as soon as a successful classification has been carried out. The computing effort required for the classification may therefore be reduced to the absolutely required degree.

According to one specific embodiment, in the step of combination, the brightness curve may be combined with a brightness curve which is characteristic for a reflecting light object, in order to classify the depicted light object as a reflecting light object or a self-luminous light object. The characteristic brightness curve may be measured once. The characteristic brightness curve may also be calculated or estimated while knowing the reflection behavior of a reflecting light object. Regardless of the type of the determination of the characteristic brightness curve, it may be stored for use by the method.

For example, in the step of combination, a correlation may be carried out between the brightness curve and the characteristic brightness curve. The correlation provides a well analyzable result, which indicates whether the brightness curves are identical, are similar to one another, or deviate strongly from one another. The light object may be classified as a function of the result. Instead of a correlation, another suitable method for the comparison of the brightness curves may be carried out.

Furthermore, the exemplary embodiments and/or exemplary methods of the present invention provide a device which is designed to carry out or implement the tasks or operations of the method according to the present invention in appropriate devices. An object of the exemplary embodiments and/or exemplary methods of the present invention may also be achieved rapidly and efficiently by this embodiment variant of the present invention in the form of a device.

A device may be understood in the present case as an electrical device, which processes sensor signals and outputs control signals as a function thereof. The device may have an interface, which may be designed as hardware and/or software.

In the case of a hardware design, the interfaces may be part of a so-called system ASIC, for example, which contains greatly varying functions of the device. However, it is also possible that the interfaces are separate integrated circuits or are at least partially made of discrete components. In the case of a software design, the interfaces may be software modules, which are provided on a microcontroller in addition to other software modules, for example.

A computer program product, having program code which may be stored on a machine-readable carrier such as a semiconductor memory, a hard drive memory, or an optical memory, and is used for carrying out the method according to one of the above-described specific embodiments, when the program is executed on a computer or a device, is also advantageous.

The exemplary embodiments and/or exemplary methods of the present invention are explained in greater detail hereafter as an example on the basis of the appended drawings.

DETAILED DESCRIPTION

Identical or similar reference numerals are used in the following description of exemplary embodiments of the present invention for elements which are shown in the various figures and act similarly, a repeated description of these elements being omitted.

Figure 1:
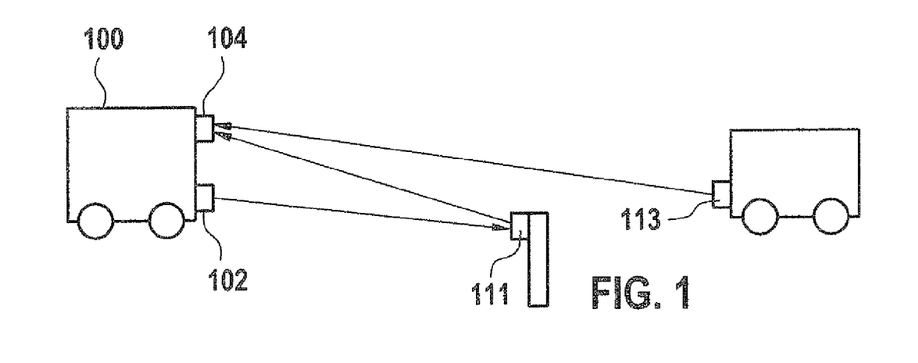
FIGS. 1 and 2 show representations of a vehicle.

FIG. 1 shows a representation of a vehicle 100 according to one exemplary embodiment of the present invention. Vehicle 100 has a headlight 102 and a camera 104. Headlight 102 is designed to illuminate an area ahead of vehicle 100 in operation. Camera 104 is designed to generate chronologically successive images which each show the area ahead of vehicle 100.

Objects, here a side column having a reflector 111 and an oncoming vehicle having an illumination 113, are located ahead of vehicle 100. Vehicle 100 moves at a speed toward the reflector and the instantaneous position of the oncoming vehicle.

Illumination 113 of the oncoming vehicle is a self-luminous light object, for example, a headlight. A light beam emitted by illumination 113, which is recorded by an image recorder of camera 104, is shown as an example in FIG. 1. An intensity of the emitted light beam recorded by the image recorder is a function of an illumination density of illumination 113 and a distance and an angle between illumination 113 and camera 104.

Reflector 111 is not self-luminous, but rather is designed to reflect incident light beams. As an example, a light beam emitted by headlight 102 is shown in FIG. 1, which is incident on reflector 111, is reflected by reflector 111, and is recorded as a reflected light beam by the image recorder of camera 104. An intensity of the reflected light beam recorded by the image recorder is a function of an illumination characteristic of headlight 102, a distance and an angle between headlight 102 and reflector 111, a reflection characteristic of the reflector, and a reflection angle, which is determined by positions of headlight 102, camera 104, and reflector 111, of the light beam emitted by headlight 102 and reflected on reflector 111.

Figure 2:
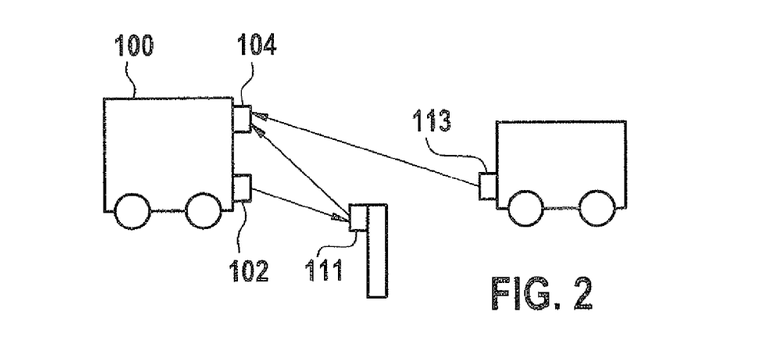

FIG. 2 shows another representation of vehicle 100 shown in FIG. 1, according to one exemplary embodiment of the present invention. Vehicle 100 is shown at a later point in time in comparison to FIG. 1. Due to the speed of vehicle 100, vehicle 100 has approached reflector 111 and illumination 113 of the oncoming vehicle. Therefore, in particular the reflection angle, which is determined by the positions of headlight 102, camera 104, and reflector 111, of the light beam emitted by headlight 102 and reflected on reflector 111 has changed. Reflector 111 therefore appears to have a different brightness in comparison to the situation shown in FIG. 1.

Figure 3:
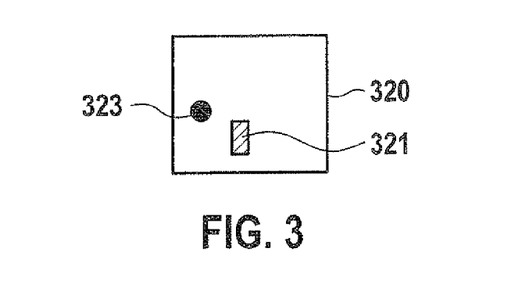
FIGS. 3 and 4 show representations of images of a vehicle camera.

FIG. 3 shows a schematic representation of an image 320, which is recorded by a vehicle camera, according to one exemplary embodiment of the present invention. This may be an image recorded by the camera shown in FIG. 1 of the situation shown in FIG. 1. A depiction 321 of the reflector shown in FIG. 1 and a depiction 323 of the illumination of the oncoming vehicle shown in FIG. 1 are apparent in image 320. Depictions 321, 323 may be recognized using a suitable image analysis of image 320. Depiction 321 of the reflector has a lower brightness level in comparison to depiction 323 of the illumination. Values of the brightnesses assigned to depictions 321, 323 may be detected and analyzed.

Figure 4:
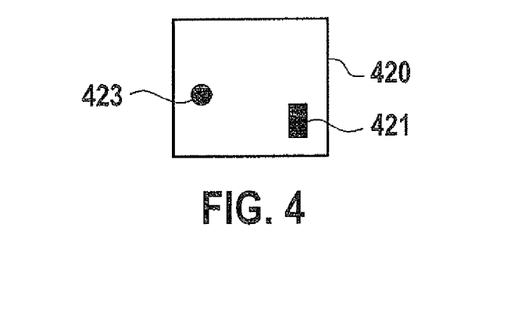

FIG. 4 shows a schematic representation of an image 420, which is recorded by a vehicle camera, according to one exemplary embodiment of the present invention. This may be an image recorded by the camera shown in FIG. 2 of the situation shown in FIG. 2. Another depiction 421 of the reflector shown in FIGS. 1 and 2 and another depiction 423 of the illumination shown in FIGS. 1 and 2 are apparent in image 420. Depictions 421, 423 may be recognized using a suitable image analysis of image 420. Depiction 421 of the reflector has a similar brightness in comparison to depiction 423 of the illumination. Values of the brightnesses assigned to depictions 421, 423 may be detected and analyzed.

Images 320, 420 shown in FIGS. 3 and 4 have been recorded at different points in time. The brightness of depictions 323, 423 of the illumination has remained approximately equal in images 320, 420. Therefore, depictions 323, 423 of the illumination display a nearly constant brightness curve over images 320, 420.

The brightness of depictions 321, 421 of the reflector has strongly changed in images 320, 420. In this case, a brightness of depiction 321 has increased in comparison to the brightness of depiction 421. Therefore depictions 321, 421 of the reflector display a changing brightness curve, which is increasing here, over images 320, 420.

Therefore, a difference in the brightness curves of depictions 321, 421 of the reflector and depictions 323, 423 of the illumination may be recognized. Through a comparison of the brightness curve of depictions 321, 421 of the reflector to a characteristic brightness curve, for example, of a characteristic reflector, depictions 321, 421 may be classified as depictions of a reflector. Corresponding thereto, through a comparison of the brightness curve of depictions 323, 423 of the illumination to a characteristic brightness curve, for example, again of a characteristic reflector, depictions 323, 423 may be classified not as depictions of a reflector and therefore as depictions of a self-luminous light object, such as an illumination. Alternatively, the comparison may be carried out using a characteristic brightness curve of a characteristic self-luminous light object.

Figure 5:
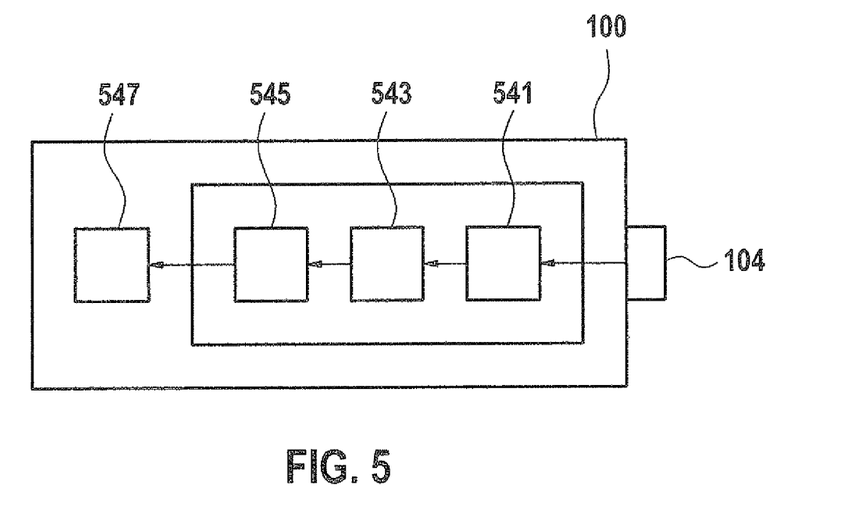
FIG. 5 shows a block diagram of one exemplary embodiment of the present invention.

FIG. 5 shows a vehicle 100 having a device for classifying a light object located ahead of vehicle 100 according to one exemplary embodiment of the present invention. Vehicle 100 may be the vehicle described on the basis of FIG. 1. Vehicle 100 has a camera 104, which is designed to generate an image, for example, the image shown in FIG. 3, of the area ahead of vehicle 100 to provide it to the device for classification with or without preprocessing.

The device for classification has a determination unit 541, a combination unit 543, and a classification unit 555. The device for classification is designed to classify a light object depicted in the images based on images provided by camera 104 and to output information concerning the type of the light object determined by the classification. The information concerning the light object and the type of the light object may be used by an assistance system 547 of vehicle 100, for example. Assistance system 547 may be an automatic high beam control system, for example.

Determination unit 541 of the device for classification is designed to receive a sequence of images or image details of images which have been recorded by camera 104. Determination unit 541 is designed to recognize one or more light objects in the sequence of images or to receive information concerning one or more light objects depicted in the sequence of images. Furthermore, determination unit 541 is designed to determine a brightness value for each light object in each image and to determine a brightness curve for each light object from the sequence of brightness values per light object for each light object. Determination unit 541 is designed to output information concerning a brightness curve for each light object. Determination unit 541 may be designed to output the brightness curve according to a predetermined number of analyzed images in which a specific object is depicted. Alternatively, determination unit 541 may be designed to determine and output a brightness curve already by analyzing a small number of images, e.g., two images, and designed to update the brightness curve after analyzing each further image in which the light object may be recognized, and output it as an updated brightness curve. Determination unit 541 may be designed to provide or scale the brightness curve using a time scale or a distance scale. For example, a route may be assigned to the brightness curve, which the vehicle has covered during the recording of the images on which the brightness curve is based or by which the vehicle has approached the light object during the recording of the images on which the brightness curve is based. In this way, different vehicle speeds or different relative speeds between the vehicle and the light object may be taken into consideration in the determination of the brightness curve.

Combination unit 543 is designed to receive the brightness curve or curves from determination unit 541 and to combine each of them with a characteristic brightness curve. To combine the brightness curves, combination unit 543 may have a correlator, which is designed to correlate values of the instantaneous brightness curve with values of the characteristic brightness curve. Combination unit 543 is also designed to provide a result of the combination of the brightness curves. The light object may be classified based on the result. Combination unit 543 may be designed to receive the characteristic brightness curve via an interface, read it out from a memory, or determine it based on instantaneous parameters of a headlight of the vehicle.

According to this exemplary embodiment, the classification of the light object or objects is carried out in a classification unit 555. Classification unit 555 is designed to analyze each result provided by combination unit 543, to determine the particular type of the light object. For this purpose, classification unit 555 may be designed to compare a result to a threshold value. If the result falls below the threshold value, this may mean, for example, that the light object is a reflecting object. If the result exceeds the threshold value, this may mean that the light object is a self-luminous object. If a brightness curve is combined by combination unit 543 with multiple different characteristic brightness curves, and therefore multiple results are generated per brightness curve, the classification carried out by classification unit 555 may be refined based on the multiple results.

Figure 6:
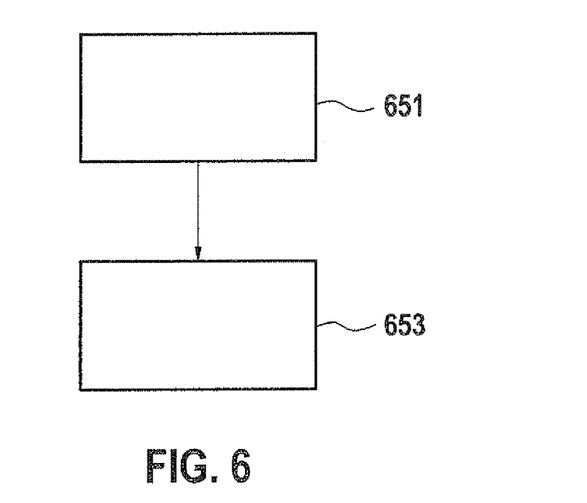
FIG. 6 shows a flow chart of one exemplary embodiment of the present invention.

FIG. 6 shows a flow chart of a method for classification of a light object located ahead of vehicle 100, according to one exemplary embodiment of the present invention. The method may be executed by the device shown in FIG. 5, for example. In a step 651, a brightness curve assigned to a light object is determined over at least two images which depict the light object at different times. In a step 653, the brightness curve is combined with a characteristic brightness curve to classify the light object. The method may be executed whenever a headlight of the vehicle actively emits light and therefore reflectors located in the influence area of the headlight may reflect the light of the headlight, for example.

Figure 7:
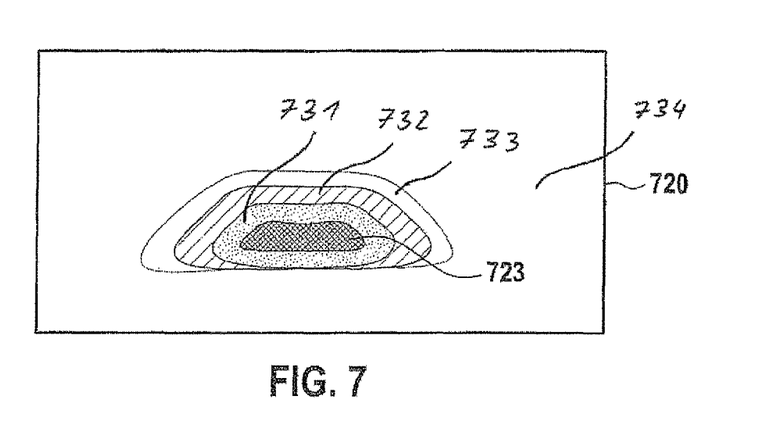
FIG. 7 shows a measured illumination map according to an exemplary embodiment of the present invention.

FIG. 7 shows a measured illumination map 720 according to one exemplary embodiment of the present invention. Illumination map 720 represents a brightness distribution 731, 732, 733, 734 of the vehicle's own high beams 723 at a defined distance. The illumination map may result from a depiction of the illumination of a white wall. Areas 733, 734 located further outside represent little illumination; in contrast, central areas 731, 732 represent intense illumination.

Illumination map 720 may be based on an image recorded by a vehicle camera. Two approximately oval areas having very high brightness are apparent. These two areas are jointly enclosed by ring-shaped areas 731, 732, 733 of decreasing brightness. The values of the illumination map may be scaled to the maximum, to read out relative brightness changes between two points on the illumination map. Each point in the illumination map corresponds to a sight beam having defined horizontal and vertical angles in relation to the viewing direction (optical axis) of the installed camera.

Alternatively, an approximation of illumination maps 720 may be carried out in each case, and a brightness curve of the areas of the approximated illumination maps which depict the high beam may be determined.

Figure 8:
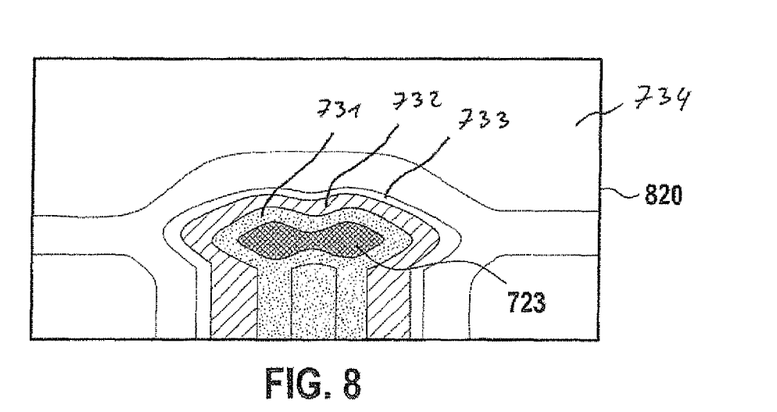
FIG. 8 shows an approximation of the measured illumination map of FIG. 7 according to an exemplary embodiment of the present invention.

FIG. 8 shows an approximation 820 of the measured illumination map shown in FIG. 7 according to one exemplary embodiment of the present invention. Approximated illumination map 820 is determined from the measured illumination map by an approximation via two one-dimensional functions. Approximated illumination map 820 in turn represents a brightness distribution 731, 732, 733, 734 of high beam 723 at a defined distance.

Figure 9:
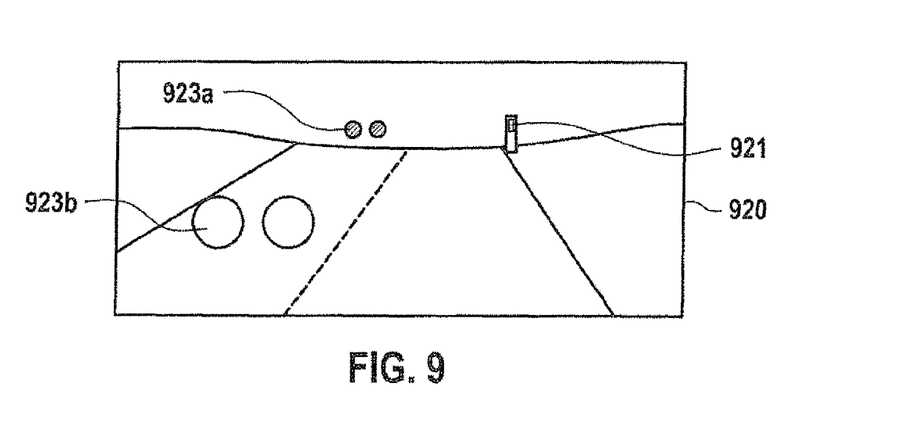
FIG. 9 shows an example image of a vehicle camera according to an exemplary embodiment of the present invention.

FIG. 9 shows an image 920, which is recorded by a vehicle camera, according to one exemplary embodiment of the present invention. This may be an image recorded by the camera shown in FIG. 1, in which the vehicle is moving on a traffic lane toward a reflector 921 situated on the right roadway edge. On the oncoming lane, two vehicles, whose headlights 923a, 923b may each be recognized as circular areas on image 920, are coming toward the vehicle. Headlights 923a of the more distant vehicle are shown smaller and having a lesser brightness than headlights 923b of the closer vehicle in image 920. Under the assumption that headlights 923a, 923b are headlights having the same light characteristic, a change in the brightness of an approaching headlight may be indirectly inferred from image 920. The closer a headlight 923a, 923b is located to the camera recording image 920, the greater the brightness.

Figure 10:
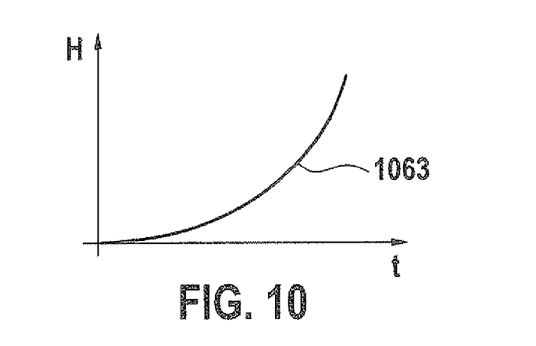
FIG. 10 shows a brightness curve of a self-luminous object, according to an exemplary embodiment of the present invention.

FIG. 10 shows a brightness curve 1063 of a self-luminous object, according to one exemplary embodiment of the present invention. The self-luminous object is a vehicle here, or more precisely the headlights of the vehicle. Brightness curve 1063 may therefore represent a change in the brightness of headlights 923b shown in FIG. 9 over time. In FIG. 10, time t is plotted on the abscissa and brightness H is plotted on the ordinate. Brightness curve 1063 may be determined based on a plurality of images, which represent the situation shown in FIG. 9 at different points in time. For each point in time of an image or an approximation of an image, the brightness value assigned to the headlight or the headlights may be determined from the image and plotted in the graph shown in FIG. 10 to determine brightness curve 1063.

Brightness curve 1063 represents a characteristic brightness curve of a light-emitting object according to one exemplary embodiment of the present invention. According to this exemplary embodiment, the characteristic brightness curve of the light-emitting object has a nonexistent brightness at the point in time zero, which, over time, initially increases slowly and finally more and more rapidly. The characteristic brightness curve of the light-emitting object may be represented by a half branch of a parabola.

Figure 11:
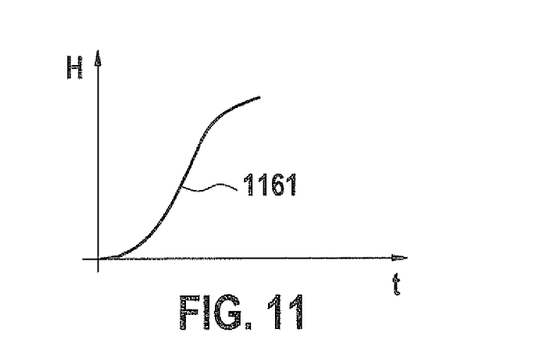
FIG. 11 shows a brightness curve of a reflecting object, according to an exemplary embodiment of the present invention.

FIG. 11 shows a brightness curve 1161 of a reflecting object, according to one exemplary embodiment of the present invention. The reflecting object is a reflector here. Brightness curve 1161 may therefore represent a change over time of the brightness of reflector 321 shown in FIG. 9. In FIG. 11, time t is plotted on the abscissa and brightness H is plotted on the ordinate. Brightness curve 1161 may be determined based on a plurality of images which represents the situation shown in FIG. 9 at different points in time. For each point in time of an image or an approximation of an image, the brightness value assigned to the reflector may be determined from the image and plotted in the graph shown in FIG. 11 to determine brightness curve 1161.

Brightness curve 1161 represents a characteristic brightness curve of a light-reflecting object according to one exemplary embodiment of the present invention. According to this exemplary embodiment, the characteristic brightness curve of the light-reflecting object has a nonexistent brightness at the point in time zero, which, over time, increases initially slowly, then more and more rapidly, and finally slowly again.

Brightness curve 1161 results from a linkage of a brightness change which results from an approach to the reflector and a brightness change which results from the illumination map. A corresponding linkage is shown in FIG. 12.

Figure 12:
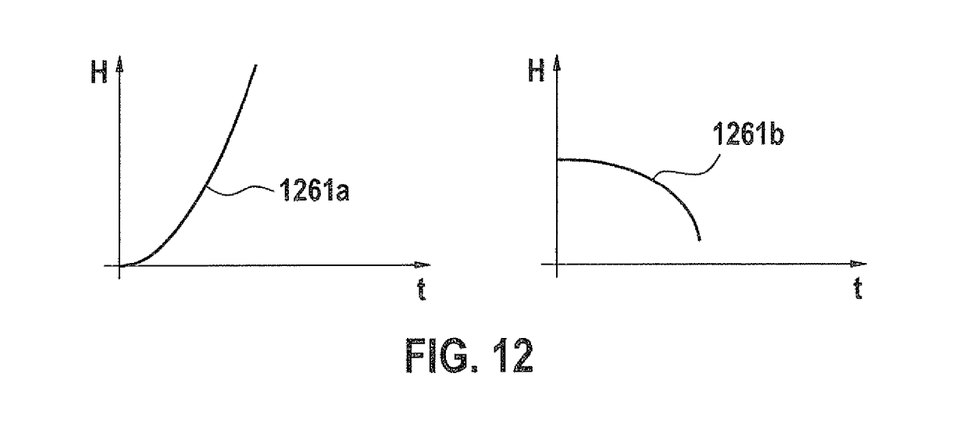
FIG. 12 shows graphs of a brightness change from an approach to a reflector and a brightness change from an illumination map, according to an exemplary embodiment of the present invention.

FIG. 12 shows, in the left graph, a brightness change 1261a from an approach to the reflector and, in the right graph, a brightness change 1261b from the illumination map. Time t is plotted on the abscissa and brightness H is plotted on the ordinate in each case. The linkage of brightness changes 1261a, 1261b may be established by a multiplication.

Figure 13:
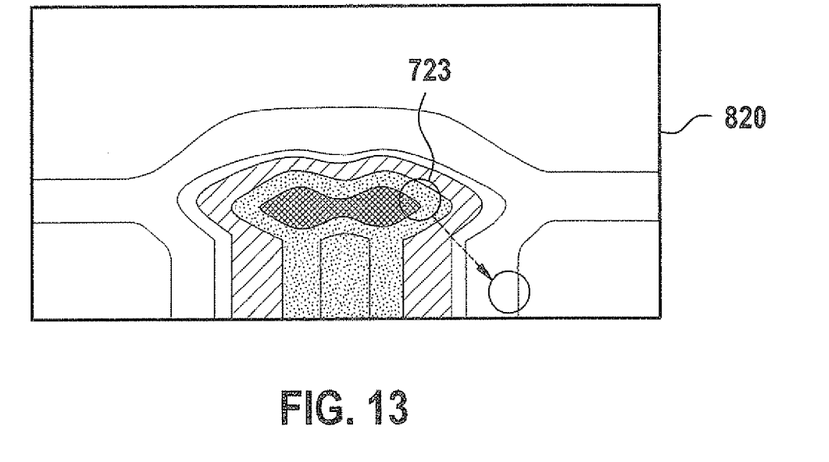
FIG. 13 shows the map of FIG. 8 with a readout of scaled values being schematically shown at two positions, according to an exemplary embodiment of the present invention.

FIG. 13 shows approximated illumination map 820 already shown in FIG. 8, the readout of scaled illumination values being schematically shown at two positions, according to one exemplary embodiment of the present invention. The two positions, shown as two circles, result from recordings of a light object at different points in time. For the two different points in time, in each case their scaled brightness of the illumination may be read out from the illumination map at the corresponding positions and used for the determination of brightness curve 1261b.

Figure 14:
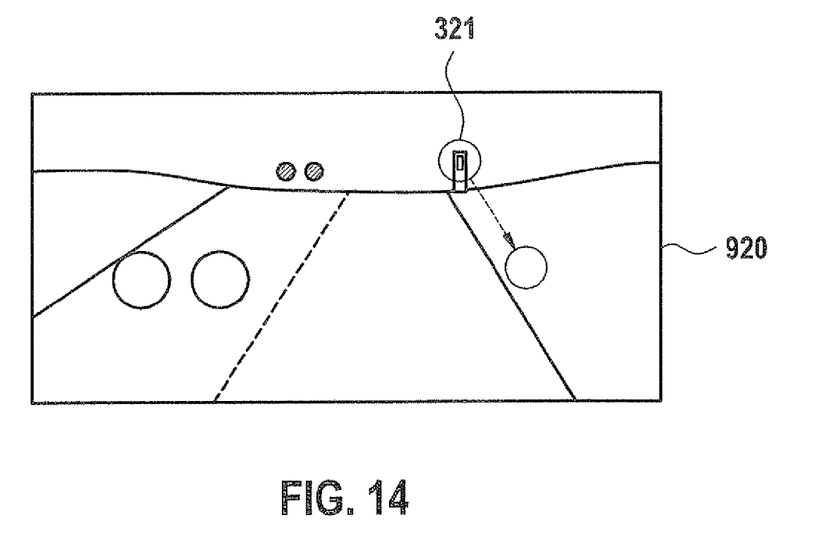
FIG. 14 shows a representation of movement of light objects in an image, according to an exemplary embodiment of the present invention.

FIG. 14 schematically shows a movement of multiple light objects in the image, according to one exemplary embodiment of the present invention. The movement represents a movement of reflector 321 relative to the camera, which records an image sequence of the situation. Different positions of reflector 321 at two different points in time are shown by two circles. Reflector 321 moves toward the bottom right, as shown by an arrow. At the two different points in time, the brightness of reflector 321 may be read out from the illumination map in each case at the corresponding positions and used to determine the brightness curve 1261b, as shown in FIG. 12, for example. The movement of reflector 321 in the image may be read out from illumination map 920, for example, with the aid of a suitable image analysis.

One exemplary embodiment of the present invention is explained in greater detail hereafter on the basis of FIGS. 1 through 14.

For a more stable recognition of reflectors, the brightness curve of light object 111, 113 is compared to the assumed brightness curve of a reflector 111 over a variable time range of 2 to N images. The absolute illumination is not of interest, but rather the type of the brightness change and also its rate of change over time. Through a correlation of these two brightness curves, once the measured brightness curve and once the brightness curve under the assumption of a reflector 111, a classification into reflector 111 and self-luminous object 113 may be carried out. The longer the time range is selected, i.e., the greater the interval between the images which are farthest apart with respect to time and analyzed for a light object, the more reliable the classification.

The instantaneous illumination characteristic and also its parameters are necessary for the determination of an assumed brightness curve of a reflector 111. The parameters may relate to, for example, the high beams on/off, the GLW steps, or the switching status of matrix beam segments. GLW stands for "sliding illumination range." It is therefore possible to set the headlight illumination in defined steps from low beams to full high beams, so that corresponding distances ahead of the vehicle (e.g., 50 m to 200 m) may be illuminated. As already described, the real illumination density is not of interest, but rather only the illumination change from pixel to pixel, i.e., a scaled illumination map is sufficient.

This illumination map may be approximated, e.g., in the case of halogen high beams, via two Gaussian distributions, or, in the case of variable headlight systems, such as GLW, MDF (masked continuous high beams), matrix beam, via parameterizable functions. For example, FIG. 7 shows an illumination map 720 and FIG. 8 shows an approximated illumination map 820.

This illumination map may be predefined. Alternatively, the map may be automatically configured based on reflectors, via classification of the light objects as reflectors and entry of the brightness changes along the reflector trajectory into the illumination map.

As is apparent from FIGS. 10 through 12, brightness curve 1161 of a reflector, in contrast to brightness curve 1063 of a self-luminous object, is defined by two components 1261a, 1261b. On the one hand, the approach toward the reflector influences the extent of the brightness. This results from the fact that the light must cover two meters less for each meter of the distance covered toward the reflector. On the other hand, the extent of the brightness is influenced based on the illumination characteristic of the installed headlights due to the illumination of the reflector changed by the approach (different angle).

For the classification of a light object 111, 113, it is initially necessary to track it over multiple images 220, 320. It is thus possible to store the brightness curve per light object 111, 113, i.e., over a certain history, and to compare this brightness curve to the expected brightness curve for a reflector 111, via the stored, approximated illumination characteristic.

For this purpose, the comparison to the reflector assumption may be carried out either continuously, from image 220 to image 320, or over a certain history, for example, a number of N images or a covered distance of M meters of the reference vehicle.

The brightness of the first occurrence of the light object may be offset percentagewise with the brightnesses of the subsequent measurements of this object and the same percentage analysis may be carried out accordingly in the illumination map. Under consideration of the possible approach toward the reflector, tendencies may be analyzed which allow the classification of the light object as a self-luminous or reflecting object.

For the comparison to the reflector assumption, for example, brightness difference DeltaPhi$_{object}$, which corresponds to a difference or a percentage difference of the brightness values between the starting point and the ending point in the history of images 220, 320, may be compared to DeltaPhi$_{Beleuchtungschar}$, from the approximated illumination characteristic, which corresponds to a difference or a percentage difference in the brightness values between the starting position of the object in the illumination map and the ending position. If these differences match under consideration of the covered distance of the reference vehicle, the correlation is thus sufficiently high, and therefore a corresponding value may be set or counters may be changed, which leads to a subsequent reflector classification.

The described exemplary embodiments shown in the figures are only selected as examples. Different exemplary embodiments may be combined with one another completely or with respect to individual features. One exemplary embodiment may also be supplemented by features of another exemplary embodiment. Furthermore, method operations or tasks according to the present invention may be executed repeatedly and in a sequence different than the described sequence.

What is claimed is:

1. A method for classifying a light object located ahead of a vehicle, the method comprising:
   determining, by processing circuitry, a brightness curve assigned to the light object via at least two images, which depict the light object at different times; and
   combining, by the processing circuitry, the brightness curve with a characteristic brightness curve to classify the light object.

2. The method of claim 1, further comprising:
   selecting the characteristic brightness curve as a function of an instantaneous illumination characteristic of a headlight of the vehicle which illuminates the area ahead of the vehicle.

3. The method of claim 1, wherein, in the determination, a first brightness of the light object in a first image, which depicts the light object, and at least one second brightness of the light object in at least one second image, which depicts the light object, are determined and the brightness curve is determined from the first brightness and the at least one second brightness.

4. The method of claim 3, wherein, in the determination, the brightness curve is determined as a change between the first brightness and the at least one second brightness.

5. The method of claim 1, wherein, in the determination, the brightness curve is determined over a number of images, which are recorded within a pre-definable time span and depict the light object.

6. The method of claim 1, wherein the determination and combination are performed continuously until the light object is classified.

7. The method of claim 1, wherein, in the combination, the brightness curve is combined with a brightness curve which is characteristic for a reflecting light object to classify the depicted light object as one of a reflecting light object and a self-luminous light object.

8. The method of claim 1, wherein, in the combination, a correlation is performed between the brightness curve and the characteristic brightness curve.

9. A device for classifying a light object located ahead of a vehicle, comprising:
   processing circuitry configured to:
      determine a brightness curve assigned to the light object via at least two images, which depict the light object at different times; and
      combine the brightness curve with a characteristic brightness curve to classify the light object.

10. A non-transitory computer readable medium on which a computer program is stored, the computer program comprising:
    program code that is executable by a computer processor, and that, when executed by the processor, causes the processor to perform a method for classifying a light object located ahead of a vehicle, the method comprising:
       determining a brightness curve assigned to the light object via at least two images, which depict the light object at different times; and
       combining the brightness curve with a characteristic brightness curve to classify the light object.

11. The non-transitory computer readable medium of claim 10, wherein the method further comprises:
    selecting the characteristic brightness curve as a function of an instantaneous illumination characteristic of a headlight of the vehicle which illuminates the area ahead of the vehicle.

12. The non-transitory computer readable medium of claim 10, wherein, in the determination, a first brightness of the light object in a first image that depicts the light object, and at least one second brightness of the light object in at least one second image that depicts the light object, are determined and the brightness curve is determined from the first brightness and the at least one second brightness.

13. The non-transitory computer readable medium of claim 12, wherein, in the determination, the brightness curve is determined as a change between the first brightness and the at least one second brightness.

14. The device of claim 9, wherein the processing circuitry is further configured to select the characteristic brightness curve as a function of an instantaneous illumination characteristic of a headlight of the vehicle which illuminates the area ahead of the vehicle.

15. The device of claim 9, wherein, in the determination, a first brightness of the light object in a first image that depicts the light object, and at least one second brightness of the light object in at least one second image that depicts the light object, are determined, and the brightness curve is determined from the first brightness and the at least one second brightness.

16. The device of claim 15, wherein, in the determination, the brightness curve is determined as a change between the first brightness and the at least one second brightness.

17. The device of claim 9, wherein, in the determination, the brightness curve is determined over a number of images, which are recorded within a pre-definable time span and depict the light object.

18. The device of claim 9, wherein the determination and combination are performed continuously until the light object is classified.

19. The device of claim 9, wherein, in the combination, the brightness curve is combined with a brightness curve which is characteristic for a reflecting light object to classify the depicted light object as one of a reflecting light object and a self-luminous light object.

20. The device of claim 9, wherein, in the combination, a correlation is performed between the brightness curve and the characteristic brightness curve.

* * * * *